United States Patent
Arora et al.

(10) Patent No.: US 11,429,821 B2
(45) Date of Patent: *Aug. 30, 2022

(54) MACHINE LEARNING CLUSTERING MODELS FOR DETERMINING THE CONDITION OF A COMMUNICATION SYSTEM

(71) Applicant: Hughes Network Systems, LLC, Germantown, MD (US)

(72) Inventors: Amit Arora, Germantown, MD (US); Archana Gharpuray, Germantown, MD (US); John Kenyon, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 180 days.

This patent is subject to a terminal disclaimer.

(21) Appl. No.: 16/987,028

(22) Filed: Aug. 6, 2020

(65) Prior Publication Data

US 2020/0410300 A1 Dec. 31, 2020

Related U.S. Application Data

(63) Continuation of application No. 16/135,182, filed on Sep. 19, 2018, now Pat. No. 10,740,656.

(51) Int. Cl.
*H04B 17/00* (2015.01)
*H04W 24/02* (2009.01)
(Continued)

(52) U.S. Cl.
CPC .......... *G06K 9/6269* (2013.01); *G06F 9/542* (2013.01); *G06N 20/00* (2019.01)

(58) Field of Classification Search
None
See application file for complete search history.

(56) References Cited

U.S. PATENT DOCUMENTS

| 6,021,383 | A | 2/2000 | Domany et al. |
| 9,107,147 | B1* | 8/2015 | Meng .................... H04W 48/18 |

(Continued)

FOREIGN PATENT DOCUMENTS

| CN | 102487293 A | 6/2012 |
| CN | 102487343 B | 11/2014 |

OTHER PUBLICATIONS

Kaushik, "An Introduction to Clustering and Different Methods of Clustering," Analytics Vidhya, dated Nov. 3, 2016, 27 pages.
(Continued)

*Primary Examiner* — Tuan A Tran
(74) *Attorney, Agent, or Firm* — Fish & Richardson P.C.

(57) ABSTRACT

Methods, systems, and apparatus, including computer programs encoded on a computer storage medium, for training and using machine learning clustering models to determine conditions a satellite communication system. In some implementations, feature vectors for a time period are obtained. Each feature vector includes feature values that represent properties of a satellite communication system at a respective time during the time period. Each feature vector is provided as input to a machine learning model that assigns the feature vector to a based on the properties of the satellite communication system represented by the feature vector. Each cluster corresponds to a respective potential operating condition of the satellite communication system. Data is generated that indicates a likelihood that each potential operating condition is the actual operating condition based on a quantity of the feature vectors that have been assigned to the cluster corresponding to the potential operating condition during the time period.

20 Claims, 8 Drawing Sheets

(51) Int. Cl.
*H04W 24/08* (2009.01)
*G06N 5/04* (2006.01)
*G06K 9/62* (2022.01)
*G06N 20/00* (2019.01)
*G06F 9/54* (2006.01)

(56) References Cited

U.S. PATENT DOCUMENTS

| | | | |
|---|---|---|---|
| 9,349,001 B2* | 5/2016 | Gathala | G06F 21/56 |
| 9,489,627 B2 | 11/2016 | Bala | |
| 9,531,867 B2* | 12/2016 | Ouyang | H04W 24/08 |
| 9,602,345 B2* | 3/2017 | Saha | H04L 41/0823 |
| 9,633,315 B2* | 4/2017 | Chapelle | G06N 20/00 |
| 9,900,790 B1* | 2/2018 | Sheen | H04L 41/5009 |
| 9,942,085 B2* | 4/2018 | Tsagkaris | H04B 7/04 |
| 10,176,428 B2* | 1/2019 | Sridhara | G06N 99/00 |
| 10,212,091 B2* | 2/2019 | Ouyang | H04L 47/2416 |
| 10,251,102 B2* | 4/2019 | Levinkron | H04W 36/0083 |
| 10,354,210 B2* | 7/2019 | Kour | G06Q 10/06313 |
| 10,375,590 B2* | 8/2019 | Bhagavatula | H04L 43/12 |
| 10,405,219 B2* | 9/2019 | Feldkamp | H04L 43/08 |
| 10,448,585 B2* | 10/2019 | Kundra | G06K 9/00771 |
| 10,598,520 B2* | 3/2020 | Pal | G01D 7/005 |
| 10,740,656 B2 | 8/2020 | Arora et al. | |
| 2008/0021686 A1 | 1/2008 | Jojic et al. | |
| 2015/0324690 A1* | 11/2015 | Chilimbi | G06N 3/08 |
| | | | 706/25 |
| 2016/0359719 A1* | 12/2016 | Travostino | H04L 41/16 |
| 2017/0149813 A1 | 5/2017 | Wright et al. | |
| 2018/0181144 A1* | 6/2018 | Steinmann | G06Q 30/0283 |
| 2018/0232592 A1* | 8/2018 | Stewart | G08B 13/19606 |
| 2019/0068443 A1* | 2/2019 | Li | G06N 20/00 |
| 2020/0090009 A1 | 3/2020 | Arora et al. | |

OTHER PUBLICATIONS

Landauer et al., "Dynamic log file analysis: An unsupervised cluster evolution approach for anomaly detection," Computers & Security, Elsevier Science, Sep. 4, 2018, 79:94-116.

PCT International Search Report and Written Opinion in International Appln. No. PCT/US2019/043374, dated Oct. 24, 2019, 14 pages.

what-when-how.com [Online] "SATCLUS: An Effective Clustering Technique for Remotely Sensed Images (Image Analysis)," [Retrieved on Nov. 27. 2018] Retrieved from http://what-when-how.com/pattern-recognition-and-machine intelligence/satclus-an-effective-clustering-technique-for-remotely-sensed-images-image-analysis/, 5 pages.

Wurzenberger et al., "Incremental Clustering for Semi-Supervised Anomaly Detection applied on Log Data," ARES, Aug. 29, 2017, 1-6.

PCT International Preliminary Report on Patentability in International Appln. No. PCT/US2019/043374, dated Apr. 1, 2021, 8 pages.

* cited by examiner

MACHINE LEARNING CLUSTERING MODELS FOR DETERMINING THE CONDITION OF A COMMUNICATION SYSTEM

CROSS-REFERENCE TO RELATED APPLICATIONS

This application is a continuation of U.S. application Ser. No. 16/135,182, filed Sep. 19, 2018, now allowed, the entire contents of which are incorporated herein by reference.

BACKGROUND

Satellite communication systems are complex systems that include multiple subsystems which, in turn, are made of multiple software and hardware components. The subsystems and components can also have multiple instances of software processes that implement the subsystems or components. For example, there may be multiple instances of Internet Protocol (IP) traffic handling subsystems to handle network traffic for a single satellite communication channel. Each subsystem, component, and software instance can have many pieces of status and statistic information that help define the state of the subsystem, component, of software instance.

SUMMARY

In some implementations, a communication system, e.g., a satellite communication system, can train and use one or more machine learning clustering models to determine a condition of the satellite communication system. The computer system can also initiate actions to resolve conditions of the satellite communication system. For example, a computer system can train a machine learning clustering model to assign data indicating properties of a satellite communication system at a particular point in time to one of a set of clusters based on the properties. Each cluster can correspond to a particular condition of the satellite communication system. For example, the machine learning clustering model can be trained to assign the data to either a normal cluster that represents normal operation of the satellite communication system, a busy cluster that represents a busier than normal operation of the satellite communication system, or an outage/degraded cluster that represents a degraded operation (e.g., slower than normal, experiencing data loss, etc.) of the satellite communication system. Other clusters can also be used (e.g., clusters for particular conditions, particular problems, particular stages of conditions, and/or particular portions, subsystems, or components of the satellite communication system that are degraded).

In some implementations, the computer system can use the clusters to determine whether to perform an action and/or select an action to perform to alter the network operation of the satellite communication system. For example, if at least a threshold number of feature vectors have been assigned to a cluster that represents a degraded operating condition, the computer system can initiate a process for selecting an action to alter the network operation of the satellite communication system and/or generate an alert to a user. This process can include using one or more machine learning models to identify a most likely cause of the condition of the satellite communication system. The process can also include using a set of rules or one or more additional machine learning models to select one or more actions to alter the network operation of the satellite communication system based on the most likely cause. The computer system can then provide data specifying the most likely cause and/or the selected action(s) to a user (e.g., a network operator) who can initiate an action. In another example, the computer system can perform the selected action(s) automatically (e.g., without user input) to alter the network operation (e.g., to resolve the condition) of the satellite communication system.

For example, the computer system can switch a storage device in response to determining that the most likely cause of a degraded satellite communication system is the storage device being slow or unresponsive. Thus, the selected action can be an action that resolves a condition (e.g., issue or problem) with the satellite communication system that is degrading the performance of the satellite communication system.

The properties of the satellite communication system for each point in time can represent a heartbeat or health of the satellite communication system at that point in time. The computer system can generate a feature vector for each point in time. The feature vector for a point in time can include feature values that indicate the properties of the satellite communication system at that point in time. Each feature vector (or a dimensionality-reduced version of each feature vector) can be provided as input to a machine learning clustering model. The machine learning clustering model can output an indication of a cluster to which the feature vector has been assigned.

The computer system can use the clusters of feature vectors to indicate the respective likelihood of each potential condition being an actual condition of the satellite communication system. The computer system can generate and present visualizations of the clusters and/or the number of feature vectors assigned to each cluster. For example, the computer system can generate a two-dimensional graph that includes an outline of each cluster and, for each cluster, a dot for each heartbeat (e.g., feature vector) assigned to the cluster. The computer system can continuously update the user interface (e.g., in real time or near real time) as the feature vectors are classified to clusters. In this way, users (e.g., network operators) can visualize the cluster (and thus, the corresponding condition) to which new heartbeats are being assigned and determine whether corrective action should be taken. For example if the new heartbeats are being assigned to an outage/degradation cluster, then performance of the satellite communication system may be degraded or starting to degrade and corrective action should be taken to prevent degradation or further degradation. The visualization(s) allow users to quickly and more efficiently determine the current health of satellite communication system (or a condition to which the system is trending) using a single interface without having to navigate to (or otherwise access) various logs, component-specific interfaces, and/or other sources of information in order to obtain the necessary information for evaluating the health of the system. As such, the interfaces described herein provide a more efficient workflow and presentation of information to the users.

As satellite communication systems are complex and include many subsystems and components, determining the condition of the satellite system can be difficult and time consuming. For example, determining a current problem can involve triaging at multiple levels of the operations. For problems that do not get resolved using a well-known procedure of evaluating certain data and restarting certain subsystems, the triage escalates to higher tiers of the support hierarchy and by the time someone is able to perform a deep dive into the problem, a significant amount of time can pass and the problem can get worse and cause further degradation to the performance of the satellite communication system.

Using the machine learning techniques described herein, a computer system can determine the condition of a satellite communication system that would otherwise not be detected. The machine learning models can detect conditions that are based on information (e.g., status and statistics information) for multiple subsystems or combinations of components that may not be commonly evaluated by a human operator or expert.

The computer system can also adapt the machine learning clustering model to changes in the satellite communication system, for example, by retraining the model using newly detected properties of the satellite communication system. This is advantageous over a rules-based system that a human operator or expert would have to adjust over time based on changes to the satellite communication system or changes in the performance of the satellite communication system. For example, a speed-based threshold for determining that a component is slower than normal may have to be adjusted each time the satellite communication system is altered such that the component operates at a higher speed. The machine learning clustering model can be updated (e.g., retrained) to account for such changes over time. For example, the machine learning model can be retrained using updated data regarding the properties of the satellite communication system.

The machine learning clustering model can also be used to determine the condition of other satellite communication networks, e.g., satellite communication systems that are similar to the satellite communication system for which the machine learning model is trained. This allows for the detection of conditions of satellite communication systems for which a sufficient amount of data is not available, such as newly deployed satellite communication systems. Although the techniques described herein are largely described in terms of satellite communication systems, the same or similar techniques can be used with other communication systems, e.g., wireline networks, cable networks, wireless networks such as mobile networks, Digital Subscriber Line (DSL) networks, and so on.

In one general aspect, the techniques disclosed herein describe methods of training and using machine learning clustering models to determine a condition of a satellite communication system. For example, a method performed by one or more computers can include: obtaining, by the one or more computers, a set of feature vectors for a particular time period, each feature vector including feature values that represent properties of a satellite communication system at a respective time during the particular time period; providing, by the one or more computers, each feature vector in the set of feature vectors as input to a machine learning model, the machine learning model being trained to receive a feature vector that includes feature values representing properties of the satellite communication system and assign the feature vector to one of a plurality of clusters of feature vectors based on the properties of the satellite communication system represented by the feature vector, each cluster of the plurality of clusters corresponding to a respective potential operating condition of the satellite communication system; receiving, by the one or more computers and from the machine learning model, and, a machine learning model output for each feature vector, the machine learning output for each feature vector indicating a particular cluster to which the feature vector is assigned; and generating and providing data that indicates, for each of multiple potential operating conditions, a likelihood that the potential operating condition is the actual operating condition based on a quantity of the feature vectors that have been assigned to the cluster corresponding to the potential operating condition during the particular time period.

Implementations can include one or more of the following features. For example, some implementations include determining that at least a threshold number of feature vectors in the set of feature vectors have been assigned to a cluster corresponding to a particular potential operating condition and, in response, performing an action that resolves the particular potential operating condition.

In some implementations, performing the action includes generating and providing, to a network operator, an alert that indicates that the satellite communication system is experiencing the particular potential operating condition.

In some implementations, performing the action includes initiating an action that alters network operation of the satellite communication system by adjusting operation of at least one component of the satellite communication system. Performing the action can include initiating an action that alters network operation of the satellite communication system by determining a most likely cause of the particular potential operating condition and selecting the action that alters the operation of the satellite communication system to resolve the most likely cause.

In some implementations, determining the cause of the particular potential operating condition includes providing one or more of the feature vectors in the set of feature vectors as input to one or more machine learning models that are each trained to receive at least one feature vector that includes feature values representing properties of the satellite communication system and output an indication of potential causes of a condition of the satellite communication system based on the properties of the satellite communication system and receiving, from each of the one or more machine learning models, one or more machine learning model outputs that indicate one or more potential causes of a condition of the satellite communication system based on the properties of the satellite communication system represented by the one or more feature vectors.

Some implementations include determining that at least a threshold number of feature vectors in a sequence of feature vectors have been assigned to a cluster corresponding to a particular potential operating condition and, in response, performing an action to resolve the particular potential operating condition.

In some implementations, generating and providing data that indicates, for each of multiple potential operating conditions, a relative likelihood that a current operating condition of the satellite communication system is the potential operating condition includes generating and providing a visualization of the number of feature vectors in the set of feature vectors assigned to each cluster.

In some implementations, the visualization includes, for each cluster, an outline of the cluster and a dot for each feature vector assigned to the cluster. Each dot can be presented at a respective location within the outline of the cluster to which the feature vector represented by the dot. The respective location can be based on feature values of the feature vector represented by the dot.

In some implementations, the visualization includes a bar chart. The bar chart can include, for each cluster, (i) a first bar that represents a count of feature vectors for a first time period that have been assigned to the cluster and (ii) a second bar that represents a count of feature vectors for a second time period that have been assigned to the cluster. The first time period can be different from the second time period. Some aspects include visually updating the visualization each time a feature vector is assigned to a cluster.

Some aspects include updating the machine learning model. Updating the machine learning model can include receiving additional training data that includes a set of feature vectors that each include feature values that represent actual properties of the satellite communication system detected at a respective time, using the machine learning model to assign each feature vector in the set of feature vectors to a cluster, and determining an updated centroid for each cluster based on feature vectors assigned to each cluster.

Some aspects include using the machine learning model to cluster feature vectors of a second satellite communication system different from the satellite communication system based on properties of the second satellite communication system and updating the machine learning model for the second satellite communication system by determining an updated centroid for each cluster based on feature vectors for the second satellite communication system that have been assigned to each cluster.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
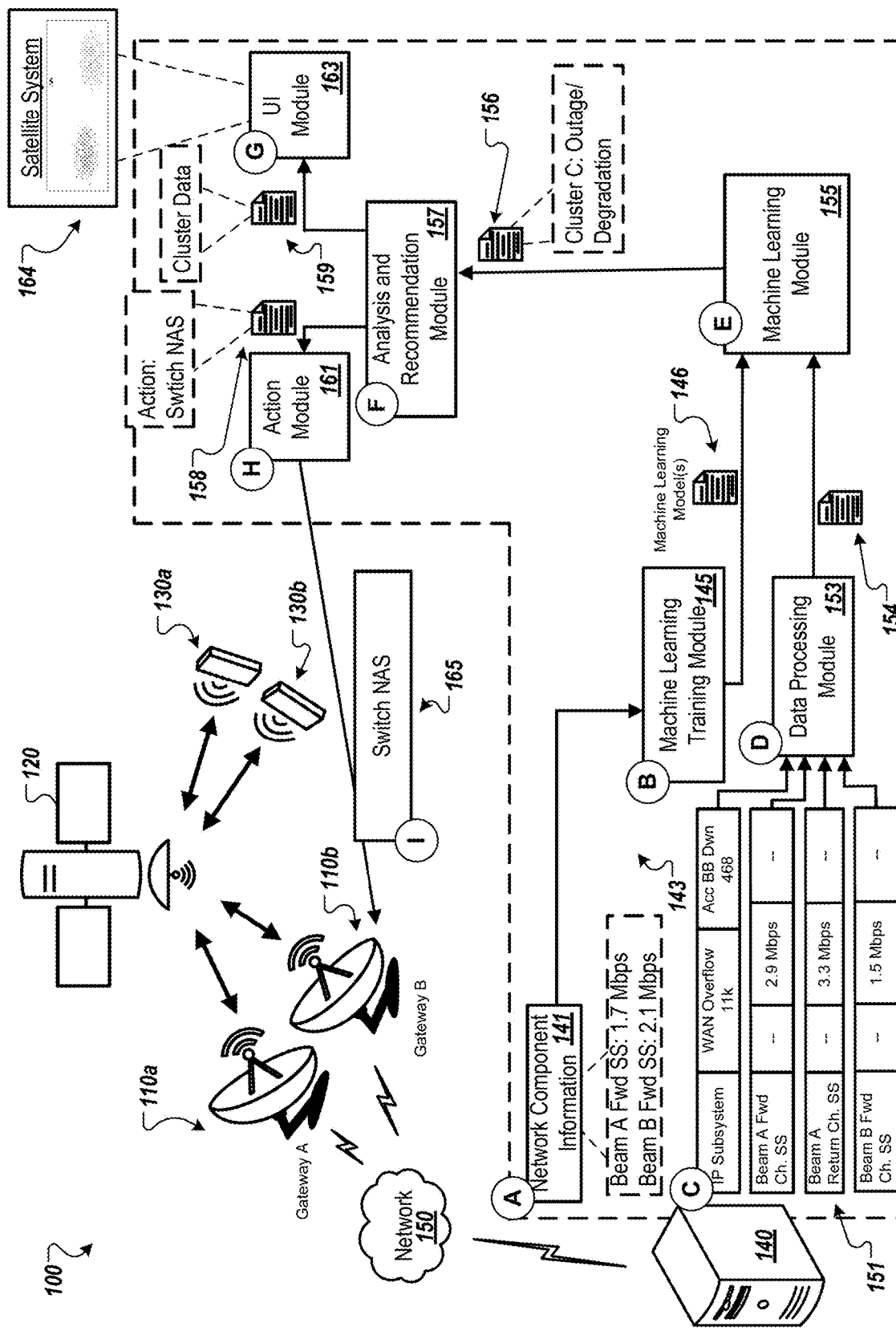
FIG. 1 is a diagram that illustrates an example of a system for using machine learning clustering models to determine conditions of a satellite communication system.

FIG. 1 is a diagram that illustrates an example of a system 100 for using machine learning clustering models to determine conditions of a satellite communication system. The system 100 includes satellite gateways 110a and 110b that communicate with a satellite 120, which in turn communicates with satellite terminals 130a and 130b. The system 110 also includes a computer system 140 that obtains information about the satellite communication system, for example, by communication with the satellite gateways 110a and 110b over a communication network 150. The elements shown can be part of a larger satellite communication network that includes several satellites, several satellite gateways, satellite terminals, and other elements not illustrated.

The satellite gateways 110a and 110b, the satellite 120, and the satellite terminals 130a and 130b can include subsystems that include multiple software and hardware components. In addition, the subsystems and their components can also have multiple instances of software processes that implement the subsystems or components. For example, a satellite gateway can include one or more IP traffic handling components, satellite forward channel handling component(s), and satellite return channel handling component(s), just to name a few of the components. The satellite gateway can also include multiple instances of the IP traffic component to handle traffic of each channel of each satellite beam.

The example of FIG. 1 illustrates how the computer system 140 can train and use one or more machine learning clustering models to evaluate the satellite communication system and determine a condition of the satellite communication system or predict a condition towards which the system is trending. For example, the computer system 140 can train and use the machine learning clustering model to determine whether the satellite communication system is operating normally, in a busy state, or experiencing an outage or degradation. Various steps of the process are illustrated as stages labelled (A) through (I) which illustrate a flow of data.

In stage (A), the computer system 140 obtains network component information 141 that includes information about (e.g., properties of) the subsystems and components of the satellite communication system. The network component information 141 can include information about the various subsystems and components of the satellites, gateways, terminals, and other elements that make up the satellite network. The computer system 140 can obtain the network component information 141 from at least some of the elements. For example, the computer system 140 can obtain the network component information 141 from one or more of the satellite gateways 110a and 110b, which can obtain information from the satellite 120 and the satellite terminals 130a and 130b. In another example, the computer system 140 can obtain the network component information from a hub (e.g., a particular gateway) that obtains the information from one or more satellite gateways 110a and 110b.

The network component information 141 can include various information for each of the subsystems, components, and their respective software instances. The information for a component can include status data (e.g., active, inactive, error state, etc.), metrics and statistics (e.g., current data transmission speeds, peak data transmission speeds, the number of items in a queue, number of dropped packets, and so on), error and alarm data indicating whether any or particular errors or alarms are present and rates of errors and alarms, and/or other appropriate information about the status or operation of the component. The type of information and the amount of information can vary based on the component or type of component. For example, the information for an IP traffic handling subsystem can be different from the information for a data storage component, e.g., for a network-attached storage (NAS) device.

The computer system 140 can obtain the network component information 141 periodically based on a specified time period, e.g., one minute, five minutes, one hour, or another appropriate time period. For each point in time, the network component information 141 represents the overall state or health of the satellite communication system at that point in time. In this example, the network component information 141 that the forward channel subsystem of Beam A has a data transmission speed of 1.7 Mbps and that the forward channel subsystem of Beam B has a data transmission speed of 2.1 Mbps. The network component information 141 can also include other information about the two beams and other information about other components of the satellite communication system.

In stage (B), a machine learning training module 145 of the computer system 140 uses the network component information 141 for multiple points in time as training examples for training one or more machine learning clustering models. In particular, the machine learning training module 145 can train the machine learning clustering model(s) using the network component information 141 that has been collected over a given time period.

Each machine learning clustering model can be any of various types, such as K-means clustering, hierarchical clustering, t-distributed Stochastic Neighbor Embedding (t-SNE), and so on. In general, training a machine learning clustering model can include assigning each set of network component information 141 (or a feature vector that includes feature values based on the network component information 141) to the cluster to which the network component information is closest. Each set of network component information 141 can be the network component information for a particular point in time. For example, in K-means clustering, the machine learning training module 145 can assign each set of network component information 141 to the cluster whose centroid is nearest to the network component information. The determination of which cluster a set of network component information 141 is closest can differ based on the type of machine learning model used.

After each set of network component information 141 is assigned to a cluster, the machine learning training module 145 can re-compute the centroid for each cluster. The machine learning training module 145 can then repeat the steps of assigning the sets of network component information 141 to the clusters and re-computing the centroids of the clusters, e.g., until the machine learning clustering model converges. The machine learning clustering model can converge when the assignments of the sets of network component information 141 to the clusters no longer change. That is, the machine learning model can be considered to have converged when the clusters (and the feature vectors assigned to each cluster) output by the machine learning model do not change for multiple iterations of the model.

Each machine learning model can be configured to receive properties of the satellite communication system (e.g., in the form of a feature vector) as input and output one or more machine learning outputs that indicate a cluster to which the properties is assigned. In some cases, the machine learning clustering model may not be able to assign a feature vector to a cluster based on the properties of the satellite communication system represented by the feature vector. For example, the machine learning clustering model may not assign a feature vector to a cluster if the feature vector is not within a threshold distance of the centroid for any of the clusters.

In general, the machine learning model can generate any number of clusters based on the similarities and differences between the properties of the satellite communication system represented by the feature vectors. As the properties of the satellite communication system are similar when the system is experiencing particular operating conditions, the feature vectors that represent the system when it is experiencing these conditions will typically be clustered together. For example, the machine learning clustering model can assign feature vectors that represent properties of the satellite communication system when the system is degraded into a same cluster. Similarly, the machine learning model can assign feature vectors that represent properties of the satellite communication system when the system is operating normally into a same cluster different from the degraded cluster.

In some implementations, the machine learning clustering can assign the feature vectors to clusters based on an operating condition of the system e.g., a normal network operation cluster, a busy network operation cluster, or an outage/degradation cluster. In some implementations, the machine learning clustering model can assign the feature vectors to other types of clusters, e.g., clusters for particular conditions, particular problems, particular stages of conditions (e.g., initial, moderate and/or severe), and/or particular portions, subsystems, or components of the satellite communication system that are degraded.

The set of clusters output by the machine learning clustering model can be predefined, e.g., by a user. For example, the machine learning clustering model can be trained using feature vectors that are each labeled with a cluster label that specifies which of the predefined clusters the feature vector belongs. The machine learning model can then be used to assign feature vectors of this satellite communication system to one of the labelled clusters.

In another example, the machine learning clustering model can use cluster labels that were previously defined and used for a similar satellite communication system. For example, the machine learning model for the similar system can be trained as described above. A user can then label the clusters output by the machine learning clustering model. The machine learning clustering model can then be used to assign feature vectors of this satellite communication system to one of the labelled clusters.

Figure 4:
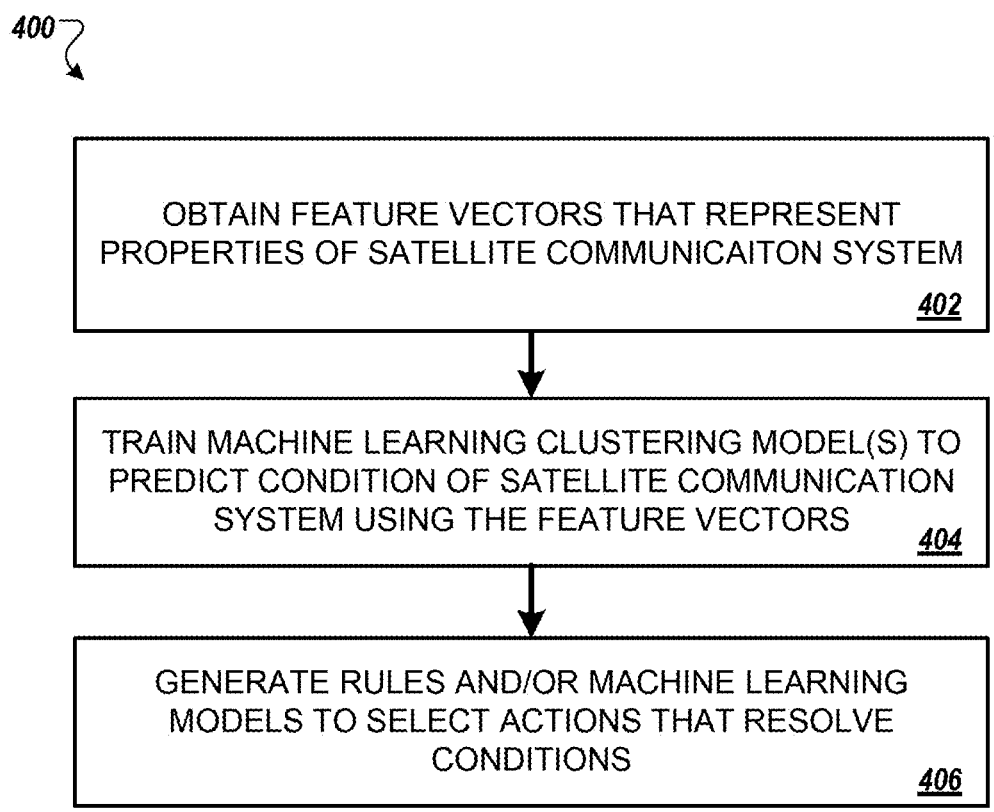
FIG. 4 is a flow diagram that illustrates an example process for training machine learning clustering models to determine conditions of a satellite communication system.

In some implementations, the machine learning training module 145 reduces the number of dimensions of each feature vector prior to using the feature vector to train the machine learning model(s). For example, the machine learning training module 145 can reduce the number of dimensions of each feature vector using a feedforward neural network, principal component analysis (PCA), another appropriate dimensionality reduction technique, and/or a combination of dimensionality reduction techniques. An example process for training a machine learning clustering model to determine conditions of a satellite communication system is illustrated in FIG. 4 and described below. In some implementations, the machine learning models are models that are configured to create low dimensional maps of high dimensional data, such as t-SNE. In this example, the machine learning training module 145 may not reduce the number of dimensions of the feature vectors. After training the machine learning model(s), the machine learning training module 145 can provide machine learning model data 146 that includes the machine learning model(s) to a machine learning module 155 that clusters feature vectors using the model(s).

In some implementations, multiple machine learning clustering models are trained and used to determine conditions of the satellite communication system. In this example, each machine learning model can be different and the machine learning outputs of the machine learning models can be combined to determine a most likely condition of the satellite communication system, as described below. The machine learning models can be trained differently and/or be of different types (e.g., one or more K-means clustering models and one or more hierarchical clustering models). The machine learning clustering models can be trained differently by using different parameters (e.g., different tuning parameters, optimizers, or layers) and/or using different subsets of the network component information.

The machine learning outputs of multiple machine learning clustering models for a particular feature vector can be combined using a voting technique. For example, the most likely condition of the satellite communication system may be considered to be the cluster to which the highest number of models has assigned the feature vector. In a particular example, if three models assign the feature vector to a normal cluster and one model assigns the feature vector to a busy cluster, the computer system 140 may determine that the most likely condition is the normal operating condition.

In stage (C), the computer system 140 obtains satellite system information 151 that indicates properties of the satellite communication network. As described above, the properties of the satellite communication system can include information about the various subsystems and components of the satellites, gateways, terminals, and other elements that make up the satellite network, e.g., similar to or the same as the network component information 141. The computer system 140 can obtain the satellite system information 151 from one or more elements of the satellite communication system, e.g., from one or more hubs (e.g., one or more gateways) of the satellite communication system. The computer system 140 can obtain the satellite system information 151 periodically based on a specified time period. Each set of properties for the satellite communication system can correspond to a particular point in time.

In this example, the satellite system information 151 includes data about an IP subsystem, a forward channel subsystem of Beam A, a return channel subsystem of Beam A, a forward channel subsystem of Beam B, and other components for which information is not presented in FIG. 1. The satellite system information 151 can include various data for each component. For example, the satellite system information 151 can include, for the IP traffic handling subsystem, a WAN queue overflow count that indicates a quantity of items added to the queue that exceeds the size of the queue and an acceleration backbone down count that indicates a number of times the acceleration backbone has went down over a time period. Similarly, the satellite system information 151 includes a data transmission speed for the forward channel subsystem of Beam A, a data transmission speed for the return channel subsystem of Beam A, and a data transmission speed for the forward channel subsystem of Beam B. Of course, the satellite system information 151 can include other data about the IP traffic handling subsystem, the forward channel subsystem, the return channel subsystem, and the infrastructure subsystem.

In stage (D), a data processing module 153 of the computer system 140 receives the satellite system information 151 and prepares the information 151 for input to the machine learning clustering model(s). As the properties of the satellite communication system (e.g., the information about the components of the satellite communication system) includes different types of information (e.g., status, alarms, numerical data, and so on), the data processing module 153 can convert the information to an appropriate (e.g., common) format. For example, the data processing module 153 can convert any non-numerical data to numerical data that represents the non-numerical data. The data processing module 153 can convert each type of non-numerical data to numerical data using a conversion function. For example, information specifying whether an alarm is present can be converted to a zero if the alarm is not present or to a one if the alarm is present.

In some implementations, the data processing module 153 aggregates a portion of the satellite system information. The data processing module 153 can aggregate information based on component type, location in the satellite communication system, and/or the type of information. For example, if there are multiple instances of a same type of component (e.g., multiple instances of an IP traffic handling subsystem) for a same gateway or same beam, the data processing module 153 can aggregate (e.g., by averaging, convex summation, or another appropriate aggregation technique) the various data about the IP traffic handling subsystem across each instance. For each piece of information for the IP traffic handling subsystem, the data processing module 153 can aggregate that piece of information for the multiple instances. For example, if a piece of information is a data transmission speed, the data processing module 153 can determine the average data transmission speed for the instances of the IP traffic handling subsystem of the gateway or beam. This aggregated value can be a feature value for a feature of the beam or gateway.

The data processing module 153 can also normalize the satellite system information 151. For example, the data processing module 153 can normalize each piece of information such that the value of each piece of information has a value within a particular value range, e.g., between zero and one inclusive. Example techniques for converting, aggregating, and normalizing information are described below with reference to FIG. 3.

In stage (F), the machine learning module 155 obtains the processed satellite system information 154 and uses the trained machine learning clustering model to assign the processed satellite system information to a cluster. In some implementations, the machine learning module 155 generates a feature vector based on the processed satellite system information 154. The feature vector can include feature values that represent the properties of the satellite communication system. For example, the feature vector can include a feature value for each piece of information for each component (and/or for each aggregated value) included in the processed satellite system information 154. This feature vector is referred to herein as a feature vector for network health (FVNH) as the feature values included in the feature vector represents the overall status or health of the satellite communication system.

In some implementations, the machine learning module 155 pre-processes the FVNH prior to providing the FVNH as input to the machine learning model(s). The pre-processing can include reducing the dimensionality of the FVNH, e.g., using a feedforward neural network, principal component analysis (PCA), and/or another appropriate dimensionality reduction technique. By reducing the dimensionality of the FVNHs, the speed at which the machine learning models determine potential causes of a condition of the satellite communication system can be increased and the accuracy of the machine learning models can be increased by preventing overfitting. An overfitted model is one that corresponds too closely to a limited set of data (e.g., to the training data) and fails to fit additional data reliably, e.g., due to having more parameters than required for the data. Reducing the dimensionality of the FVNHs can reduce the chances of overfitting.

The machine learning module 155 can provide the preprocessed FVNH (and optionally one or more other preprocessed FVNHs for the same time period) as input to each machine learning model. Each machine learning model can output machine learning outputs 156 based on the FVNH(s). The machine learning outputs 156 from each machine learning model indicate a cluster to which the FVNH is assigned based on the feature values of the FVNH. For example, a machine learning model can, as the result of training, have identified multiple clusters. The machine learning model can assign the FVNH to the cluster, of the multiple clusters, nearest to the FVNH in vector space. For example, the machine learning model can assign the FVNH to the cluster that has a centroid that is nearest to the FVNH.

In stage (G), an analysis and recommendation module 157 receives the machine learning outputs from each machine learning model. If multiple machine learning models are used, the analysis and recommendation module 157 can combine the outputs to determine which cluster to assign the FVNH. The analysis and recommendation module 157 can assign the FVNH to a cluster based on the number of machine learning models that have assigned the FVNH to the cluster. For example, if two machine learning models assign the FVNH to a "busy network operation cluster" and one FVNH assigns the FVNH to a "normal network operation cluster," the analysis and recommendation module 157 can assign the FVNH to the "busy network operation cluster."

In some implementations, the analysis and recommendation module 157 can also perform or initiate actions based on the machine learning outputs. For example, the analysis and recommendation module 157 can perform or initiate an action based on the number of FVNHs assigned to a particular cluster during a particular time period, the percentage of FVNHs assigned to a particular cluster during the particular time period, and/or the frequency at which FVNHs are being assigned to the particular cluster during the particular time period. The time period can be a duration of time going back from a current time, e.g., the previous hour, previous two hours, or another appropriate time period, so that the time period represents the recent condition of the satellite communication system. In a particular example, the analysis and recommendation module 157 can generate and provide an alert to a user (e.g., a network operator) in response to at least a threshold number of FNVHs being assigned to an "outage/degraded" cluster during the particular time period as this is an indication that the satellite communication system is experiencing or trending towards a degraded operating condition. The analysis and recommendation module 157 can generate alerts in various formats, such as e-mail alerts, text message alerts, and/or voice alerts using a spoken language interface (e.g., installed at an operator terminal).

The analysis and recommendation module 157 can determine whether the satellite communication system is trending towards a degraded operating condition or in a degraded operating condition based on the frequency at which FVNHs are being assigned to the outage/degraded cluster and/or how close FVNHs are getting to the centroid of the outage degraded cluster. The frequency at which FVNHs are being assigned to the outage/degraded cluster can be equal to or proportional to the number of FVNHs assigned to the outage/degraded cluster over time (e.g., the number of FVNHs per hour). The analysis and recommendation module 157 can determine that the system is trending towards a degraded condition if the frequency is greater than a first threshold or if the frequency is increasing at a rate that exceeds a second threshold. Similarly, the analysis and recommendation module 157 can determine that the system is in a degraded condition if the frequency is greater than a third threshold or if the frequency is increasing at a rate that exceeds a fourth threshold. In this example, the third threshold can be greater than the first threshold and the fourth threshold can be greater than the second threshold.

The analysis recommendation module 157 can also determine that the satellite communication system is trending towards a degraded condition if at least a threshold number of FVNHs are within a first distance of the centroid of the degraded/outage cluster. Similarly, the analysis recommendation module 157 can also determine that the satellite communication system is in a degraded condition if at least a threshold number of FVNHs are within a second distance of the centroid of the degraded/outage cluster. The second distance can be shorter than the first distance. In this example, the closer the FVNHs get to the centroid, the more likely it is that the system is in a degraded operating condition.

In some implementations, the analysis and recommendation module 157 can initiate an action to alter the network operation of the satellite communication system based on the machine learning outputs, e.g., based on the number of FVNHs assigned to a particular cluster during a particular time period. For example, if at least a threshold number of FVNHs are assigned to an "outage/degraded" cluster during the particular time period, the analysis module 157 can initiate or obtain information from a process that identifies a most likely (e.g., root cause) of a condition of the satellite communication system. This process can identify a most likely cause of the condition using one or more machine learning models that have been trained to output a most likely cause based on one or more FVNHs. These machine learning models can be trained using labelled training examples that include previous FVNHs and, for each previous FVNH, a label that indicates the cause of the condition of the satellite communication system.

The analysis and recommendation module 157 can also select an action to alter network operation of the satellite communication system based on the most likely cause. For example, the analysis and recommendation module 157 can use a set of rules or additional machine learning models to select the action based on the most likely cause. The set of rules can specify, for each cause, one or more actions to alter the network operation of the system in response to the cause.

The additional machine learning models for selecting the action can be trained to select an action based on the most likely cause and/or the FVNH(s) (e.g., the FVNH(s) that have been assigned to the particular cluster or that have been received during the particular time period). The machine learning models can be trained using labelled feature vectors that are labelled with actions that were performed to alter the operation of the satellite communication system (e.g., that corrected a problem with the satellite communication system). In some implementations, the feature vectors used to train the machine learning models include a vector of probabilities for the potential causes. The feature vectors can also be labelled with a level of effectiveness of the action. For example, if multiple actions were attempted to correct a problem, the label for the feature vectors that represent the properties of the satellite communication system while the problem was occurring can include each attempted action and a level of effectiveness of the action. In this way, the machine learning models can be trained to output an action based on how effective that action is predicted to be at altering the operation of the satellite communication system. The machine learning models can be trained using feature vectors that have been labeled with causes of conditions and data specifying the effectiveness of one or more actions in resolving the condition on the satellite communication system and/or on other similar satellite communication systems. The analysis and recommendation module 157 can provide data 158 identifying the selected action(s) to an action module 161.

In some implementations, the analysis and recommendation module 157 can invoke another system that determines a cause of the condition of the satellite communication system and selects an action to alter the operation of the system based on the cause, e.g., using the set of rules or machine learning models. The separate system can determine the cause and select the action in response to receiving a request from the analysis and recommendation module 157. In another example, the separate system can continuously monitor for causes of conditions of the system. The separate system can provide data specifying the cause and the selected action (or a ranked list of actions) to the analysis and recommendation module 157.

In some implementations, the analysis and recommendation module 157 selects an action based on the cluster to which one or more FVNHs have been assigned, e.g., without determining a cause of the condition of the satellite communication system. For example, the analysis and recommendation module 157 can be configured to restart a network component (e.g., a gateway, storage device, etc.) if at least a threshold number of FVNHs are assigned to the degraded/outage cluster. In another example, the analysis and recommendation module 157 can be configured to restart a network component (e.g., a gateway, storage device, etc.) if at least a threshold number of FVNHs are assigned to the degraded/outage cluster during a particular time period (e.g., between 1:00 AM and 3:00 AM).

In stage (G), the analysis and recommendation module 157 can provide cluster data 159 that specifies the cluster to which the FVNH has been assigned to a user interface module 163. The user interface module 163 can generate and/or update one or more user interfaces that present data regarding the clusters and the number of FVNHs that have been assigned to each cluster. The user interfaces can indicate, for each of multiple potential operating conditions of the satellite communication system, a likelihood that the current operating condition of the system is the potential operating condition. For example, if more FVNHs have been assigned to a particular cluster than each of the other clusters over the last fifteen minutes, it is more likely that the condition of the system is the condition corresponding to the one cluster.

Figure 6:
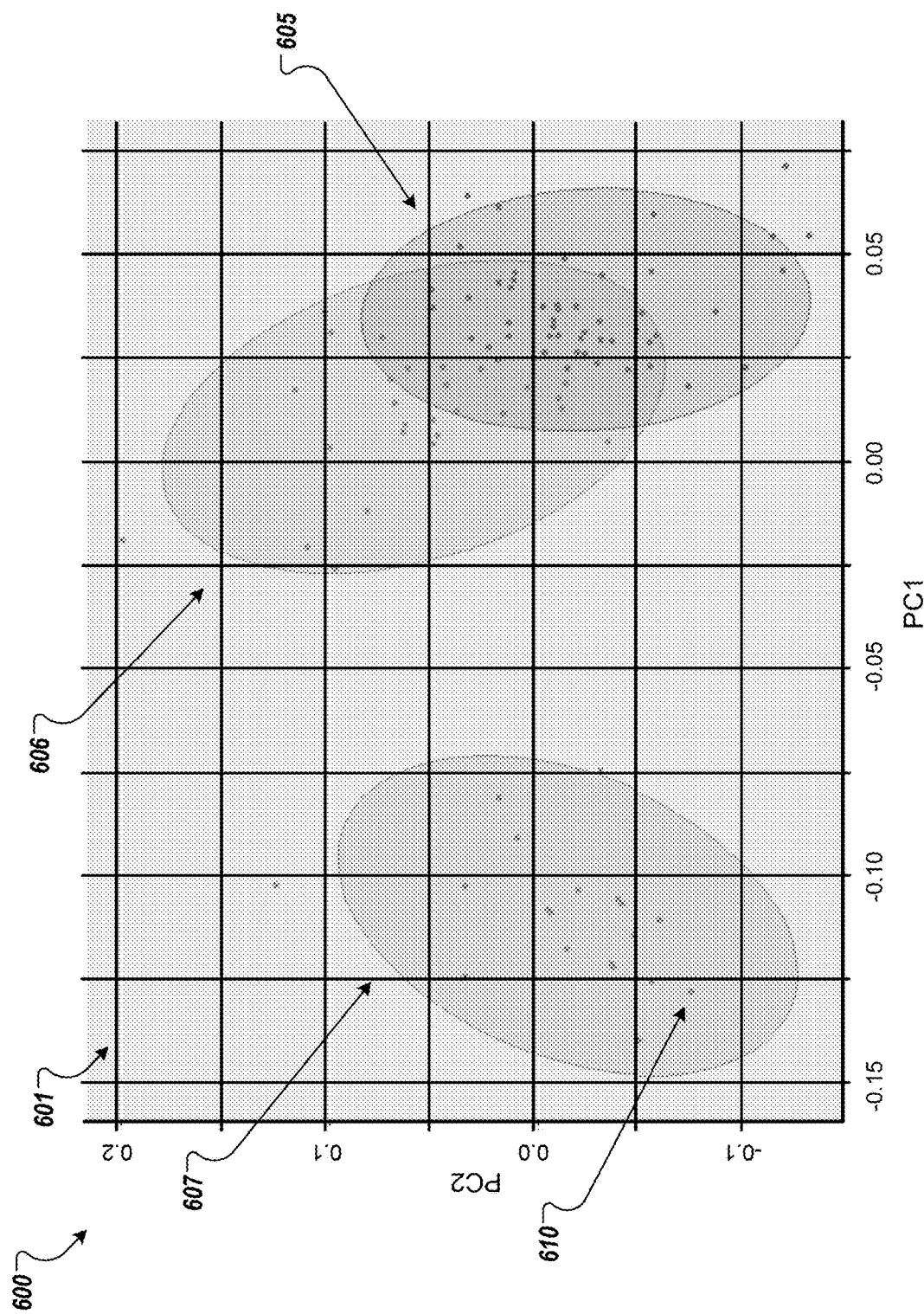
FIG. 6 is an example user interface that includes a visualization of clusters of feature vectors.
Figure 7:
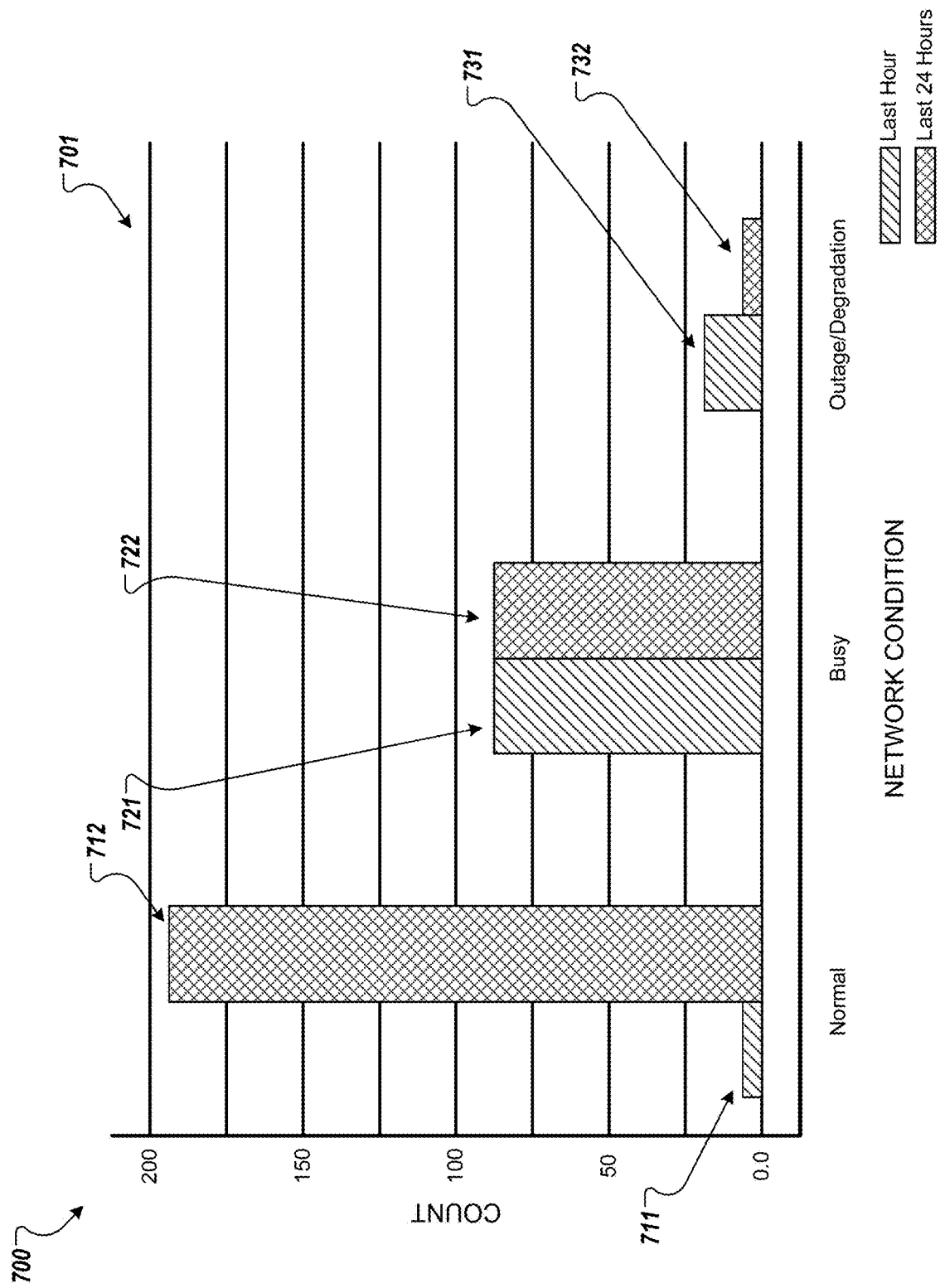
FIG. 7 is an example user interface that includes a visualization of a number of feature vectors assigned to each of multiple clusters.
Figure 8:
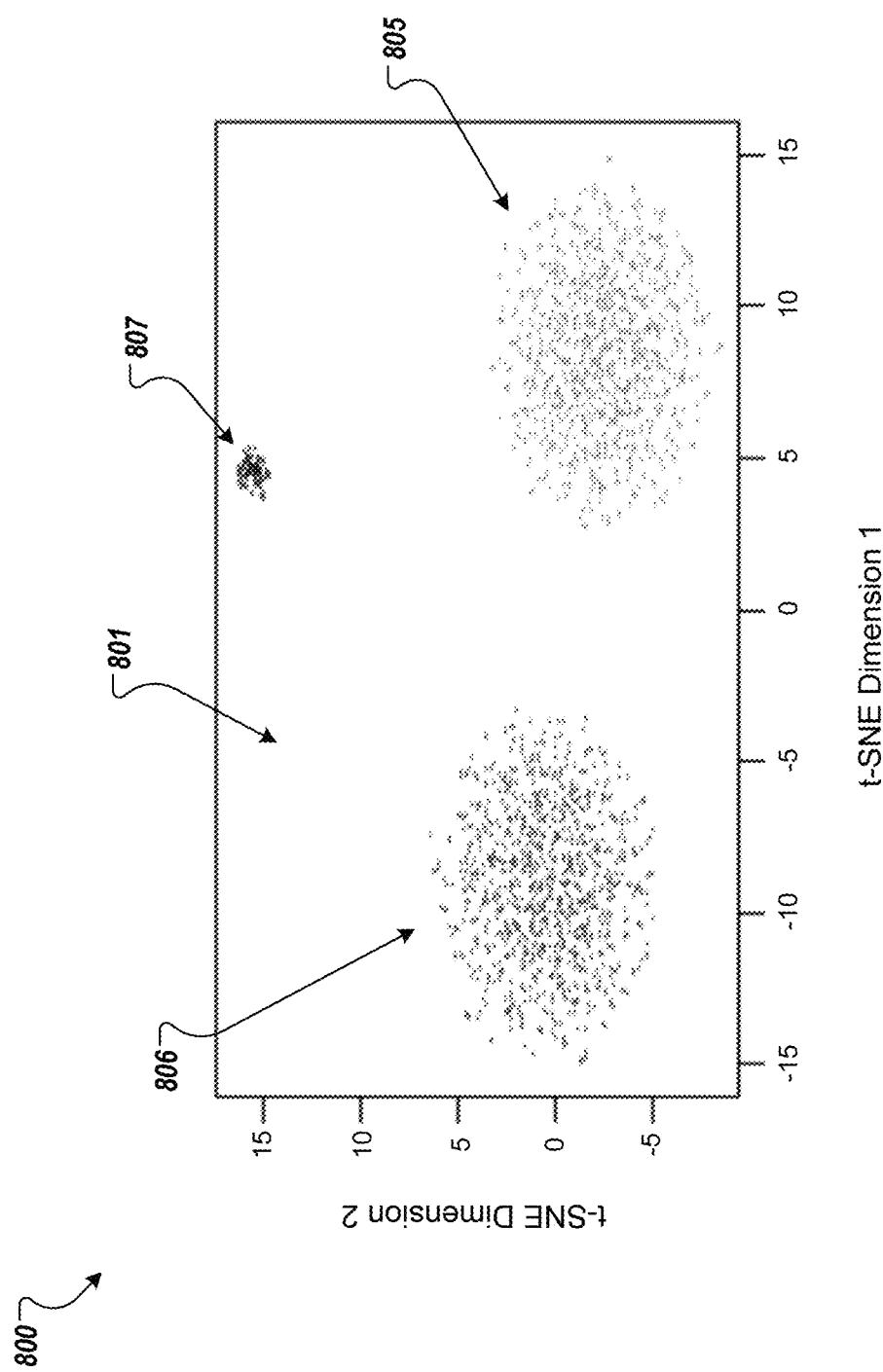
FIG. 8 is an example user interface that includes a visualization of clusters of feature vectors.

The user interface module 163 can update the user interface(s) continuously in real time (e.g., as the FVNHs as obtained and classified) or periodically based on a specified time period. In this way, a user can watch where the FVNHs are being assigned and determine whether the system is operating normally or trending towards a degraded condition or an outage. This can allow the user to take corrective action prior to the system becoming degraded. For example, if multiple FVNHs have been assigned to "degraded/outage cluster" over the last ten minutes, the user may want to take action before the condition of the system worsens. Some example user interfaces are illustrated in FIGS. 6-8 and described below.

In stage (H), the action module 161 determines whether to perform an action to alter the network operation of the satellite communication system. In some implementations, the action module 161 prompts the user 143 to select from one or more recommended actions, e.g., the one or more actions selected by the analysis and recommendation module 157. If the user 143 selects an action, the action module 161 can cause a component of the satellite communication system to perform the action. For example, if the user selects to reconfigure a component or to switch to a backup component, the action module 161 can adjust the configuration of the component or switch to the backup component.

In some implementations, the action module 161 performs one or more actions automatically, e.g., without the user 143 selecting or initiating the action. For example, the action module 161 can cause a component of the satellite communication system to perform an action (e.g., a top rated action selected by the analysis and recommendation module 157). The action module 161 can then monitor the status and other information about the subsystems and components of the satellite communication system to determine whether or not the action was effective. If not, the action module 161 can cause another action to be performed, e.g., a next highest ranked action.

The action module 161 can determine to perform an action automatically based on the category or severity of the condition or the category or severity of the cause of the condition. For example, the action module 161 can be configured (e.g., include a set of rules) to perform the action automatically if the condition is categorized in one of a set of pre-specified categories or has at least a threshold severity level. In another example, the action module 161 can be configured to perform the action automatically after a duration of time passes (since the condition or cause was first detected) and the user 143 has not selected an action or performed an action. In another example, the action module 161 can be configured to perform the action automatically when a percentage of the FVNHs received over the last hour (or another time period) are assigned to a degraded/outage cluster. In another example, the action module 161 can consider the time of day, e.g., by automatically performing an action if FVNHs are being assigned to the degraded/outage cluster at a time when the system often operates in a degraded condition). The action module 161 can also be configured to not perform an action automatically for other situations, e.g., situations for which the action module 161 has not been configured to perform an action automatically. This proactive action can prevent a problem with the satellite communication system from escalating.

In stage (I), the action module 161 provides data 165 to a component of the satellite system to initiate the action. In this example, the selected action is to switch the NAS device to another NAS device (e.g., as part of a failover) as the cause of the condition is a slow NAS device. In this example, the action module 161 can provide data 165 to a network management system that controls the NAS devices. The data can cause the network management system to switch the NAS device to another NAS device, e.g., a backup NAS device.

Figure 2:
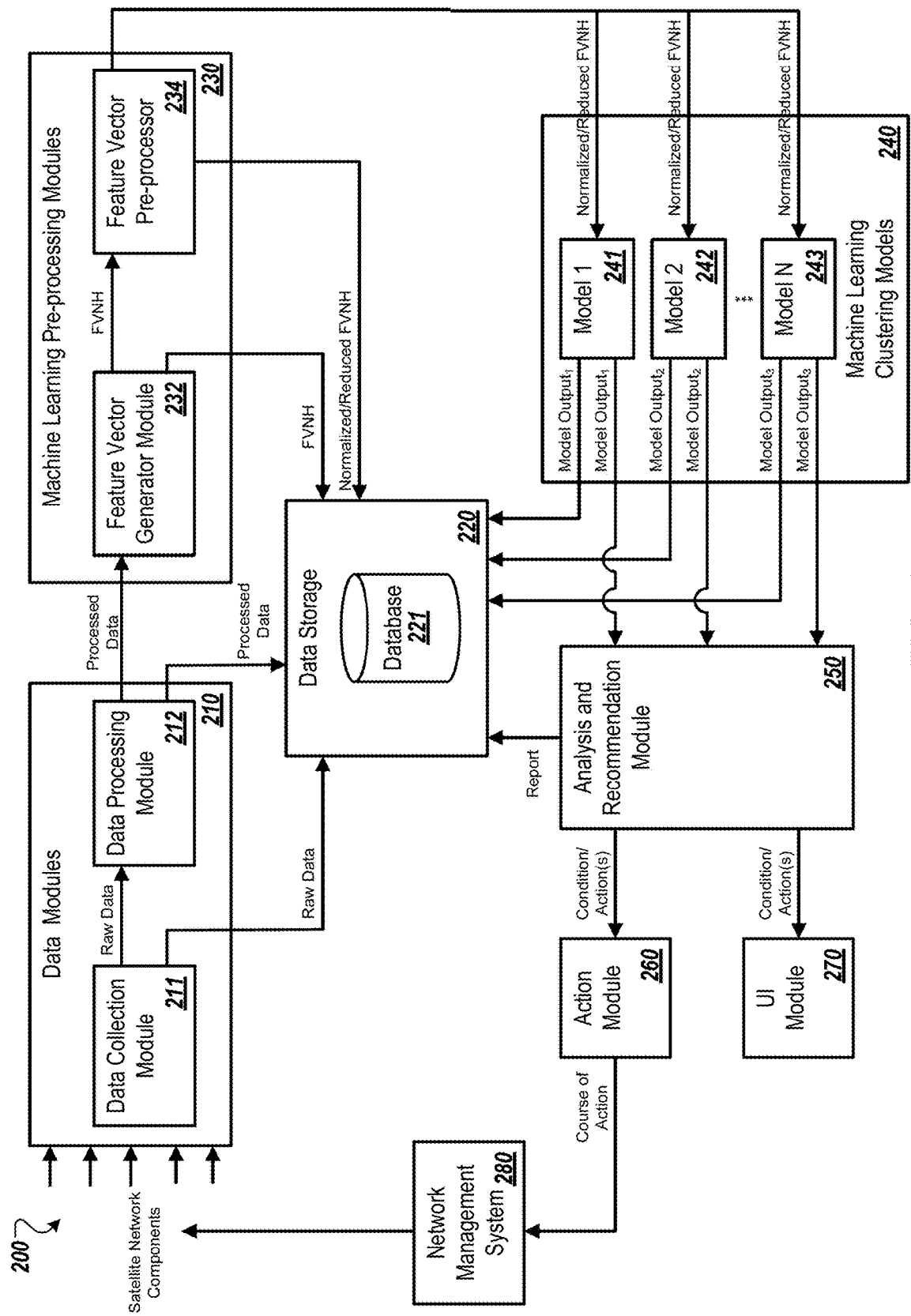
FIG. 2 is a diagram that illustrates an example of a system for using machine learning clustering models to determine conditions of a satellite communication system.

FIG. 2 is a diagram that illustrates an example of a system 200 for using machine learning clustering models to determine conditions of a satellite communication system and includes similar elements as the system 100 of FIG. 1. The system 200 can be implemented in one or more computing systems. The system 200 includes a data module 210 that includes a data collection module 211 and a data processing module 212. The data collection module 211 can obtain network component information (e.g., the network component information 141) from the subsystems and components of the satellite communication system. As described above, the network component information can include various information for each of the subsystems, components, and their respective software instances. The data collection module 211 can obtain the information periodically based on a specified time period, e.g., one minute, five minutes, one hour, or another appropriate time period.

The data collection module 211 can provide the raw data received from the component(s) of the satellite communication system to the data processing module 212 and to a data storage device 220 for storage in a database 221. The data storage device 220 can be implemented as a NAS device.

The data processing module 212 can prepare the raw data for input to machine learning clustering models. This preparation can include converting the information to an appropriate format, aggregating the information, and/or normalizing the information. As described above, some information (e.g., status and alarm data) can be in the form of text. This text data can be converted to numerical data using a conversion function.

Figure 3:
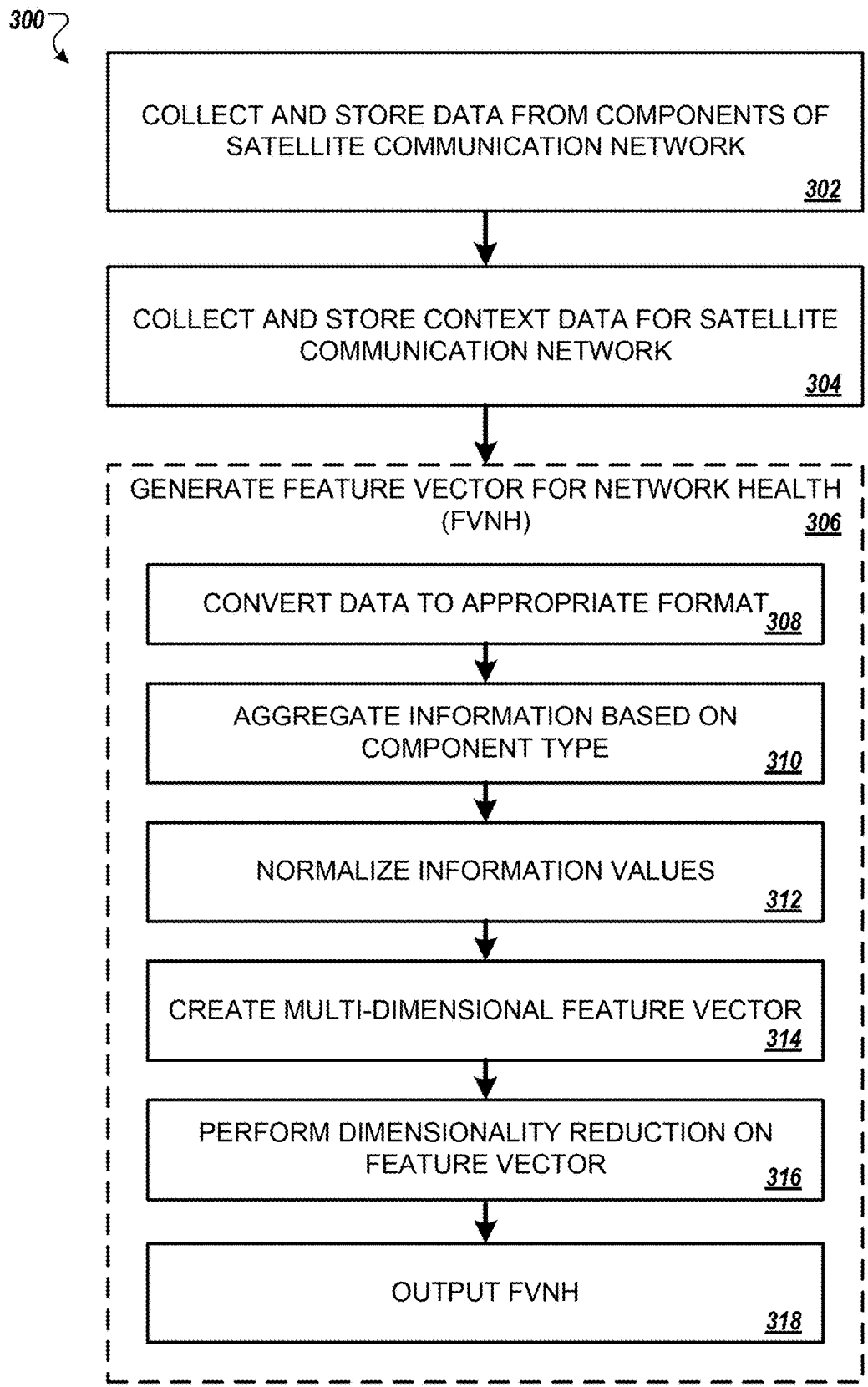
FIG. 3 is a flow diagram that illustrates an example process for generating a feature vector for network health.

The data processing module 212 can aggregate a portion of the information based on component type, location in the satellite communication system, and/or the type of information. For example, as described above, each piece of information for multiple instances of the same type of component and within the same part of the network (e.g., part of the same channel, beam, or gateway) can be aggregated using averaging, convex summation, of another appropriate aggregation technique. The data processing module 212 can also normalize the information and any aggregated information to a particular range, e.g., from zero to one inclusive. Example techniques for converting, aggregating, and normalizing data are illustrated in FIG. 3 and described below.

The data processing module 212 can provide the processed data to machine learning pre-processing modules 230 and to the data storage device 220. The machine learning pre-processing modules 230 include a feature vector generator module 232 and a feature vector pre-preprocessor 234. The feature vector generator module 232 can generate a feature vector (e.g., a FVNH) using the processed data received from the data processing module 212. The FVNH can be an n-dimensional vector that includes each processed value received from the data processing module. As described above, the FVNH can represent the overall status or health of the satellite communication system at a particular point in time. In some implementations, the FVNH can represent a particular subsystem, e.g., a subsystem for which network operators would like to monitor the condition.

The feature vector generator module 232 provides the FVNH to the feature vector pre-processor 234 and to the data storage device 220 for storage in the database 221. Each FVNH can be stored in the database 221 with the time corresponding to the data included in the FVNH (e.g., the time at which the data was measured or obtained by the data collection module 211).

The feature vector pre-processor 234 can perform dimensionality reduction on the FVNH using one or more dimensionality reduction techniques. In some implementations, the feature vector pre-processor 234 reduces the dimensionality of the FVNH using a first dimensionality reduction technique, e.g., using a feedforward neural network. For example, an m-stage feedforward neural network can reduce the dimensionality of the FVNH from n dimensions to m dimensions (e.g., from more than 100 to between 5 to 10). The feature vector pre-processor 234 can also further reduce the dimensionality of the resulting reduced dimension FVNH using a second dimensionality reduction technique, e.g., PCA. For example, this can reduce the dimensionality from 5-10 dimensions to three dimensions to make it easier for a human to visualize the results.

The feature vector pre-processor 234 can provide the reduced dimension FVNH(s) to an ensemble of machine learning clustering models 240 and to the data storage device 220 for storage in the database (e.g., with their corresponding times). As described above, each machine learning clustering model 241-243 can be configured to receive, as input, an FVNs and output a cluster to which the FVNH has been assigned. Also, as described above, each machine learning model 241-243 can be trained or configured differently from each other machine learning model 241-243.

In some implementations, two versions of the FVNH are provided as input to each machine learning model. For example, the first version can be the reduced FVNH that was reduced using the first dimensionality reduction technique, e.g., to 5-10 dimensions. The second version can be the reduced FVNH that was reduced using the second dimensionality reduction technique, e.g. to three dimensions. In this example, the machine learning output of both versions of the FVNH can be combined for each machine learning model 241-243. For example, the number of models that assigned the FVNH to each cluster can be counted. The FVNH can then be assigned to the cluster to which the most models have assigned to FVNH, e.g., using a voting technique as described above.

The machine learning outputs of the machine learning models 241-243 are provided to an analysis and recommendation module 250 and to the data storage device 220 for storage in the database 221. The analysis and recommendation module 250 can combine machine learning outputs received from multiple machine learning models and determine a cluster to which the FVNH should be assigned based on the outputs. As mentioned above, the analysis and recommendation module 250 can assign the FVNH to a cluster based on a majority vote from the machine learning models. For example, if five models assigned the FVNH to a first cluster and three models assigned the FVNH to a second cluster, the analysis and recommendation module 250 can assign the FVNH to the first cluster.

The analysis and recommendation module 250 can also initiate and/or perform an action based on the machine learning outputs for the FVNH and optionally the machine learning outputs for previous FVNHs. For example, as described above, the analysis and recommendation module 250 can initiate or perform an action based on the number of FVNHs assigned to a particular cluster during a particular time period, the percentage of FVNHs assigned to a particular cluster during the particular time period, or a frequency at which FVNHs are being assigned to the particular cluster during the particular time period. If an action is selected, the analysis and recommendation module 250 can provide data indicating the selected action to an action module 260 that can cause the action to be performed. As described above, the action module 260 can cause the selected action to be performed, e.g., automatically, based on the category of the cause, the severity of the condition, and/or based on a duration of time elapsing without user action. If the action module 260 can initiate the action by providing data (e.g., an instruction) to a network management system 280 that performs the action or causes a component of the satellite communication system to perform the action.

The analysis and recommendation module 250 can also provide data indicating the cluster to which the FVNH has been assigned to a user interface module 270. The user interface module 270 can generate and update user interfaces that present data indicating the number of FVNHs assigned to each cluster. Example user interfaces that can be generated and updated by the user interface module 270 are illustrated in FIGS. 6-8 and described below.

FIG. 3 is a flow diagram that illustrates an example process 300 for generating an FVNH. The process 300 can be performed by the computer system 140 of FIG. 1 to generate an FVNH that can be input to one or more machine learning models and/or used to train one or more machine learning models. The process 300 can be performed on an ongoing or periodic basis to generate FVNHs that represent the status or health of the satellite communication system over time.

In step 302, the computer system 140 collects and stores data from components of a satellite communication system. The data can include information about (e.g., properties of) the subsystems and components of the satellite communication system. For example, as described above, the information can include status data, metrics, statistics, alarm data, error data, and/or other appropriate information about the components. The data can be collected periodically based on a specified time period. Each set of data can be stored with a time stamp that indicates a time at which the data was obtained.

In step 304, the computer system collects and stores context data for the satellite communication system. The context data for a FVNH can include a condition of the satellite communication system, a time period in which the condition occurred, a cause of the condition, one or more actions taken (or not taken) to alter the operation of the satellite communication system (e.g., to correct a problem or issue), categories of the causes, conditions, and/or actions, and/or appropriate context data. The context data can be obtained from a user (e.g., a network operator or network expert). For example, the computer system can prompt the user to provide the data, e.g., on a periodic basis. The context data for a particular point in time can be stored with (or with a reference to) the network component data collected for the particular point in time.

In step 306, the computer system 140 generates an FVNH using the collected data. The computer system 140 can generate the FVNH using constituent steps 308-318.

In step 308, the computer system 140 converts the data to an appropriate format. For example, the computer system 140 can convert any non-numerical data to numerical data. In a particular example, the computer system 140 can convert status data that can be one of a set of predefined statuses to a number that represents the status using a conversion function that maps each status to a corresponding numerical value.

In step 310, the computer system 140 aggregates information based on component type. For example, each component of a same type can have the same types of status, statistical, and other data. A subsystem can also include multiple instances of the same component. In these situations, the same data for multiple instances of the same component can be aggregated (e.g., by averaging or convex sum) to provide a condition indication for a larger subsystem or the whole system.

For example, let $C_i$ i∈[1 . . . n] represent the $i^{th}$ component or subsystem and $s_{ij}^{(t)}$ j∈[1 . . . m] represent the $j^{th}$ type of status or statistics of an instantiation of the $i^{th}$ component or subsystem at time t. The computer system 140 can aggregate the status or statistic $s_{ij}^{(t)}$ from individual software instantiations of the same type of component to derive $S_{ij}^{(t)}$ using a function f. For example, the computer system 140 can perform the aggregation using Relationship 1 below:

$$S_{ij}^{(t)} = f_i(s_{ij_1}^{(t)}, s_{ij_2}^{(t)}, s_{ij_3}^{(t)}, \ldots, s_{ij_n}^{(t)}) \quad \text{Relationship 1:}$$

In this example, $S_{ij}^{(t)}$ represents an aggregate of the status or statistic $s_{ij}^{(t)}$. The function f is an aggregation function, e.g., an average or a convex summation. For example, $S_{ij}^{(t)}$ can be an average data transmission speed for forward channel subsystems for a particular beam, gateway, or the entire satellite communication system. The FVNH can include each $S_{ij}^{(t)}$ for each statistic or status of each type of component in the satellite communication system. For example, the FVNH for time t can be represented by Relationship 2 below:

$$\text{FVNH}^t = [S_{11}^t, S_{12}^t, \ldots S_{1j}^t, S_{21}^t, S_{22}^t, \ldots S_{2j}^t, \ldots S_{i1}^t, S_{i2}^t, \ldots S_{ij}^t] \quad \text{Relationship 2:}$$

In some implementations, the computer system 140 aggregates for multiple hierarchical levels within the system. For example, the computer system 140 can first aggregate at the service provider level by aggregating the same status and statistic data across each type of component for each service provider. Next, the computer system 140 can aggregate at the beam level by aggregating the same status and statistic data across all service providers for each individual beam. Next, the computer system 140 can aggregate at the gateway level by aggregating the same status and statistic data across each beam of each individual gateway. Finally, the computer system 140 aggregates for the satellite communication system by aggregating the same status and statistic data across all gateways of the satellite communication system.

In another example, the computer system 140 can aggregate data by identifying, for a component of the satellite communication system, properties of multiple sub-components of the component at the time corresponding to the feature vector. The computer system 140 can determine a property that represents the multiple sub-components based on the properties of the multiple sub-components (e.g., by averaging or otherwise combining the properties of the sub-components). The computer system 140 can include, in the feature vector, the determined property as a property of the component.

In another example, the computer system 140 can identify, for a particular satellite beam, multiple components of a same type (e.g., multiple forward channel subsystems). The computer system 140 can identify multiple properties of each of the multiple components. The computer system 140 can determine, for each property, an aggregated value that represents an aggregation (e.g., average) of the property across each of the multiple components. The computer system 140 can include, in the feature vector, the aggregated value as a property of the satellite beam.

In step 312, the computer system 140 normalizes the values of the data. For example, the computer system 140 can normalize each piece of data to be within a range of zero and one, inclusive, or another appropriate range. The computer system 140 can normalize the aggregated values as well as the non-aggregated values.

In step 314, the computer system 140 creates a multi-dimensional feature vector that includes, as feature values, each normalized value. The feature values represent the properties of the satellite communication system. The feature vector is also referred to herein as the FVNH as the feature values the status or health of the satellite communication system at a particular point in time.

In step 316, the computer system 140 performs dimensionality reduction on the FVNH. As described above, the computer system 140 can reduce the dimensionality of the FVNH using one or more dimensionality techniques, such as feedforward neural networks and/or PCA. For example, the computer system 140 can use an m-stage feedforward neural network to reduce the number of dimensions of the FVNH from "n" to "m," where "m" is less than "n" and "n" is the number of dimensions of the FVNH prior to dimensionality reduction. In some implementations, the computer system 140 can further reduce the dimensionality of the FVNH using PCA or another appropriate dimensionality reduction technique.

In operation, the accuracy of using, as input to the machine learning models, each reduced version can be monitored. If the accuracy using the reduced FVNH that was reduced to a dimensionality of "m" is greater than the accuracy of using the further reduced FVNH, then the reduced FVNHs may be used to detect the causes of conditions of the satellite communication system rather than the further reduced FVNHs.

In step 318, the reduced and/or further reduced FVNH are output. For example, the FVNH(s) can be provided to a machine learning training module for use in training machine learning clustering models, as described below with reference to FIG. 3. The FVNH(s) can also be provided as input to one or more machine learning clustering models, as described below with reference to FIG. 4.

FIG. 4 is a flow diagram that illustrates an example process 400 for training machine learning clustering models to determine conditions of a satellite communication system. The process 400 can be performed by the computer system 140 of FIG. 1.

In step 402, the computer system 140 obtains feature vectors that represent properties of the satellite communication system. For example, the computer system 140 can generate FVNHs using the process 300 of FIG. 3. The FVNHs used to train the machine learning clustering model (s) can include FVNHs that represent properties of the satellite communication during a particular time period. For example, the computer system 140 can collect FVNHs over the given time period until the computer system 140 has a sufficient amount of training examples (e.g., at least a threshold number of FVNHs).

In step 404, the computer system 140 trains one or more machine learning clustering models using the FVNHs. As described above, when multiple machine learning clustering models are used, each of multiple machine learning clustering models can be trained differently, e.g., using different training parameters. The different training parameters can include different types of machine learning clustering models, different configurations (e.g., different tuning parameters, different optimizers, etc.) of a same type of machine learning model, different subsets of the FVNHs, and/or other appropriate parameters. The machine learning model(s) can be configured to output a data indicating a cluster to which an input FVNH has been assigned.

In step 406, the computer system 140 generates rules and/or machine learning models to select actions that resolve conditions of the satellite communication system. As described above, a set of rules can specify an action based on one or more of the causes having the highest probabilities. The set of rules can be generated and maintained by a network operator, network expert, or another user. As described above, the machine learning models for selecting the action can be trained to select an action based on the most likely cause and/or the feature vectors used to determine the potential causes and the probabilities of the potential causes.

Figure 5:
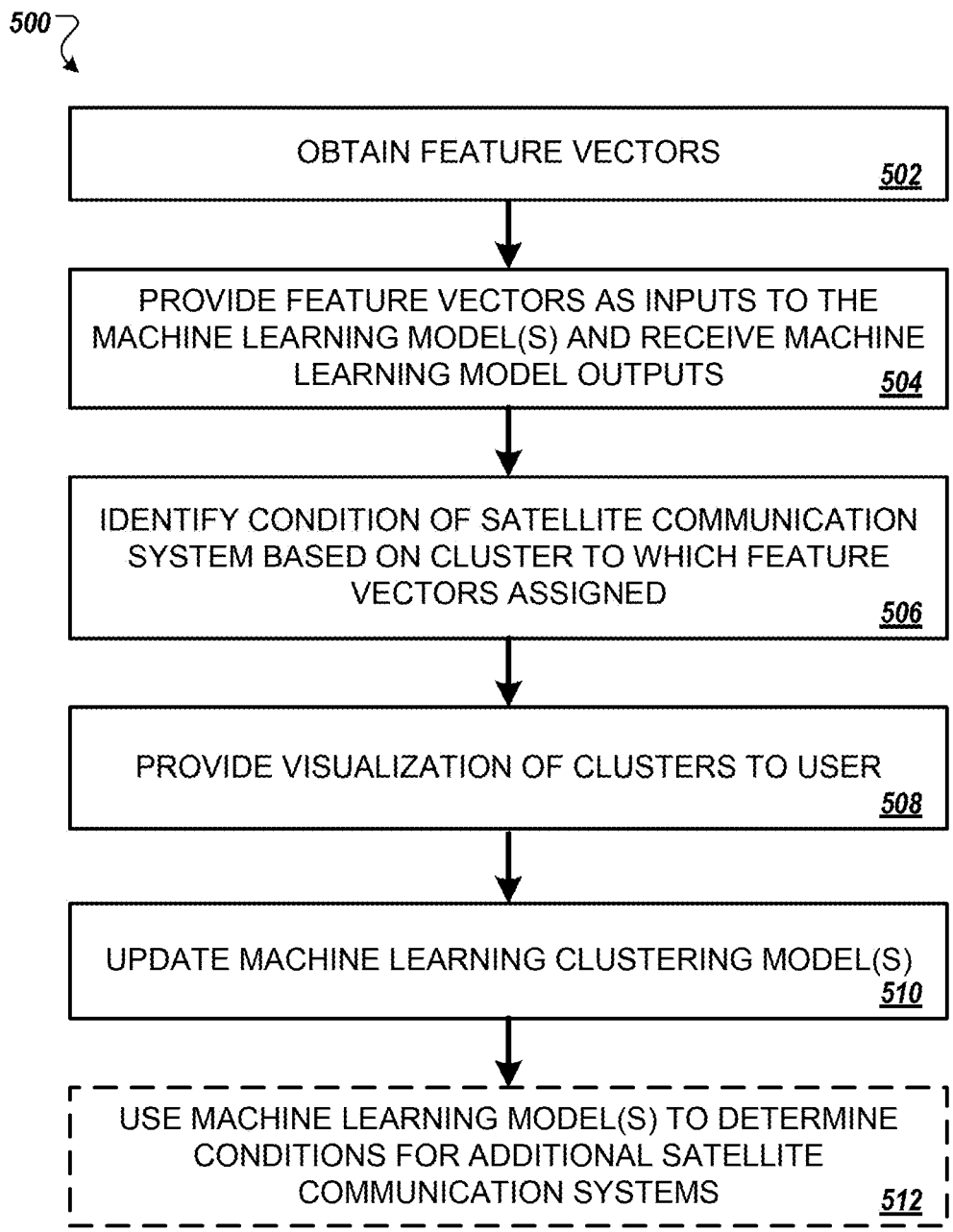
FIG. 5 is a flow diagram that illustrates an example process for using machine learning clustering models to determine conditions of a satellite communication system and performing a selected action to alter operation of the satellite communication system.

FIG. 5 is a flow diagram that illustrates an example process 500 for using machine learning clustering models to determine conditions of a satellite communication system and performing a selected action to alter operation of the satellite communication system. The process 500 can be performed by the computer system 140 of FIG. 1.

In step 502, the computer system 140 obtains a feature vector that represents the current status of the satellite communication system. The feature vectors can be an FVNH (e.g., a reduced FVNH output by the process 300) that includes feature values that represent properties of a satellite communication system. The obtained FVNH can represent the status or health of the satellite communication system.

In step 504, the computer system 140 provides the feature vector as input to the machine learning clustering model(s) and receives machine learning output(s) from each machine learning clustering model. For example, each machine learning clustering model can assign the feature vector to a cluster and output an indication of the cluster to which the feature vectors has been assigned. Each machine learning clustering model can assign the feature vector to a cluster based on the properties of the satellite communication system represented by the feature vector. For example, each machine learning model can assign the feature vector to the cluster that has a centroid that is nearest to the feature vector.

In step 506, the computer system 140 can identify a condition of the satellite communication system based on one or more machine learning outputs. For example, multiple machine learning models are used, the computer system 140 can determine, for each cluster, a number of models that assigned the feature vector to the cluster. The computer system 140 can identify, as the condition of the satellite communication system, the condition corresponding to the cluster to which the models have assigned the feature vector.

In another example, the computer system 140 can identify the condition of the satellite communication system based on the clusters to which multiple feature vectors over a particular time period have been assigned. For example, the computer system 140 can determine, for each cluster, a number of feature vectors that have been assigned to the cluster during the particular time period. The computer system 140 can identify, as the condition of the satellite communication system, the condition corresponding to the cluster to which the most feature vectors have been assigned. The time period can be a recent time period, e.g., the previous fifteen minutes, previous hour, or another appropriate time period.

In step 508, the computer system 140 provides a visualization of the clusters to a user. For example, the computer system 140 can generate a user interface that presents the number of feature vectors assigned to each cluster over a particular time period. Each time a new feature vector that represents a current condition of the satellite communication system is assigned to a cluster, the computer system 140 can update the visualization to indicate that the feature vectors have been assigned to the cluster. Similarly, the visualization can be updated to remove the effect of older feature vectors (e.g., feature vectors that were classified to clusters prior to the particular time period) on the clusters. In this way, the visualization represents the recent conditions of the satellite communication system and users can view recent trends in the condition of the system. Example user interfaces are illustrated in FIGS. 6-8 and described below.

As described above, the computer system 140 can also initiate or perform an action based on the cluster to which the feature vector is assigned. For example, the computer system 140 can generate and provide an alert if at least a threshold number of feature vectors are assigned to a particular cluster, e.g., a cluster corresponding to a degraded or outage condition. In another example, the computer system 140 can initiate a process to identify a cause of the condition and/or select an action to alter the network operation of the satellite communication system based on the number of feature vectors assigned to a particular cluster.

In step 510, the computer system 140 updates the machine learning clustering model(s). As new feature vectors are assigned to clusters, the computer system 140 can re-compute the centroids for each cluster, e.g., using the feature vectors assigned to each cluster. In some implementations, the computer system 140 can update the centroids in the machine learning clustering model(s) periodically based on a specified time period. For example, rather than update the centroids in the live machine learning clustering models each time a feature vector is assigned to a cluster, the computer system 140 can re-compute the centroids and update the centroids in the live models periodically.

In step 512, the computer system 140 (or another computer system) uses the machine learning clustering model(s) to detect conditions of other satellite communications systems. For example, the same machine learning clustering mode(s) can be used to detect conditions of similar satellite communication systems and satellite communication systems for which the amount of data is not sufficient to train accurate models. The machine learning clustering models that are used for another satellite communication system can be updated based on the feature vectors obtained for the other satellite communication system, similar to the way the machine learning clustering model(s) for the satellite communication system are updated in step 510. In this way, the machine learning models are retrained based on the actual conditions of the system for which the models are being used.

The computer system 140 (or another computer system) can identify similar satellite communication systems using one or more criteria. The criteria can include types and/or arrangements of components in the systems, spectrum size, data traffic (e.g., application level traffic), geographic location, and/or other appropriate criteria. For example, if two satellite communication systems have similar sized (e.g., within a threshold spectrum amount) forward and/or return links, the computer system 140 can determine that the two systems are similar.

In another example, if at least a portion of the application level traffic (e.g., at least 50% of the application level traffic) is of a same type, the computer system 140 can determine that the two systems are similar. In a particular example, two systems that are primarily used by small offices and home users may have a common type of application level traffic and two systems that are primarily used for enterprise applications may have a common type of application level traffic. In this example, the computer system 140 can determine that the two systems primarily used by small offices and home users are similar. Similarly, the computing system 140 can determine that the two systems primarily used for enterprise applications are similar.

In yet another example, satellite communication systems in the same geographic region (e.g., same country, continent, state, etc.) may have similar architecture or traffic patterns. In this example, the computer system can determine that the systems are similar if they are located in the same geographic region.

FIG. 6 is an example user interface 600 that includes a visualization 601 of clusters 605-607 of feature vectors. The computer system 140 of FIG. 140 can present the user interface 600, e.g., to network operators or other users. In this example, the user interface 600 includes three clusters 605-607 that are shown in a two-dimensional graph. The cluster 605 can correspond to a normal network operation condition, the cluster 606 can correspond to a busy network operation condition, and the cluster 607 can correspond to a network outage/degradation condition.

In this example, the clusters 605-607 are presented in two dimensions for ease of illustration. However, the feature vectors can be reduced to other numbers of dimensions (e.g., three dimensions or more). For example, as described above, the computer system 140 can reduce the dimensionality of the feature vectors to three dimensions using feedforward neural network and/or PCA dimensionality reduction techniques.

The user interface 600 can present each cluster 605-607 in a particular color corresponding to the cluster 605-607. For example, the color of the cluster 605 can be different from the colors of the clusters 606 and 607. The user interface 600 can also present an outline of each cluster 605-607 that indicates the feature values that correspond to the clusters 605-607.

The user interface 600 also presents a dot for each feature vector. Of course, other types of indicators can be used to represent the feature vectors, such as emojis, colored stars, or other objects that would attract the attention of a human operator. The dot for each feature vector is presented at a location within the graph that corresponds to the feature values of the feature vector for the two dimensions. The dot for a feature vector can be presented in the same (or a similar) color as the color for the cluster to which the dot has been assigned. This allows the user to identify which cluster each dot has been assigned, e.g., in cases where the feature values cause the dot for the feature vector to be presented outside of the visualization of the cluster.

As feature vectors are assigned to one of the clusters 605-607, the computer system 140 can update the user interface 600 to add a dot for the feature vector to the visualization 601. By adding the dots continuously (e.g., in real time) as the feature vectors are assigned to clusters, users can see which cluster the most recent feature vectors are being assigned. For example, if the dots for the more recent feature vectors are being assigned to the cluster 607 that corresponds to a network outage/degradation condition, this may imply that the satellite communication system is trending towards or already in an outage or degradation state.

In some implementations, the computer system 140 can animate the visualization 601 or highlight the dots for newer feature vectors so that users can more readily see which cluster the more recent feature vectors have been assigned. For example, the dots for newer feature vectors (e.g., those received within a threshold duration of a current time) can be presented in a brighter color or a different color than the dots for older feature vectors. In another example, the computer system 140 can store multiple frames and animate the frames. Each frame can represent the visualization 601 at a particular point in time. The computer system 140 can present the frames in order based on time so that the user can see how the clusters have changed over time. For example, the computer system 140 can store a frame the represents the visualization 601 every 10 minutes. The computer system 140 can then animate changes over the last hour by presenting the last six frames in order.

The visualization indicates, for the conditions corresponding to each cluster, the likelihood that the current operation condition of the satellite communication system is that condition. For example, if a cluster includes more dots than the other clusters, it is more likely that the current operating condition of the system is the condition that corresponds to the cluster having the most dots. When the visualization 601 is animated using frames, the new dots are being added in subsequent frames to a particular cluster can indicate that the most likely current operating condition of system is the condition that corresponds to the cluster to which the new dots are being added. The visualization 601 enables a user to easily determine which condition is most likely, e.g., without navigating to multiple user interfaces or other sources of information.

FIG. 7 is an example user interface 700 that includes a visualization of a number of feature vectors assigned to each of multiple clusters. In this example, the user interface 700 includes a bar graph 701 that includes bars for each of three clusters. In particular, the bar graph 701 includes two bars for each cluster, a first bar for the last one hour and a second bar for the last 24 hours.

Each bar represents a count of a number of feature vectors that have been assigned to a cluster during the corresponding time period. For example, the bar graph 701 includes a first bar 711 and a second bar 712 for the cluster corresponding to the normal network operation cluster. The first bar 711 represents the number of feature vectors for the satellite communication system that have been assigned to the normal network operation cluster in the last hour and the second bar 712 represents the number of feature vectors for the satellite communication system that have been assigned to the normal network operation cluster in the last 24 hours.

Similarly, the bar graph 701 includes a first bar 721 and a second bar 722 for the cluster corresponding to the busy network operation cluster. The first bar 721 represents the number of feature vectors for the satellite communication system that have been assigned to the busy network operation cluster in the last hour and the second bar 722 represents the number of feature vectors for the satellite communication system that have been assigned to the busy network operation cluster in the last 24 hours. The bar graph 701 also includes a first bar 731 and a second bar 732 for the cluster corresponding to the outage/degradation cluster. The first bar 731 represents the number of feature vectors for the satellite communication system that have been assigned to the outage/degradation cluster in the last hour and the second bar 732 represents the number of feature vectors for the satellite communication system that have been assigned to the outage/degradation cluster in the last 24 hours prior to the last hour (i.e., from 25 hours ago to one hour ago).

By presenting the number of feature vectors assigned to each cluster for both the one hour and 24 hour time periods, a user can readily determine the current condition (or likelihood of each potential condition being the current condition) of the satellite communication system and in which direction the system is trending, if any. In the illustrated example, the bar graph 701 indicates that the system was mostly operating in a normal condition for the last 24 hours based on the height of the bar 712 being greater than the bars 722 and 732. However, in the last hour, there have been more feature vectors assigned to the busy network operation cluster and the outage/degradation cluster than the normal network operation cluster, as indicated by the relative heights of the bars 711, 721, and 731. Thus, a user can readily determine that the satellite communication system is either currently in, or trending towards, a degraded or outage condition. The relative heights of the bars 731 and 732 also indicate that more feature vectors have been assigned to the outage/degradation cluster in the last hour than in the last 24 hours.

The computer system 140 can update the bars in the bar graphs 701 as new feature vectors are assigned to clusters. For example, if the machine learning model(s) assign a feature vector for a current condition of the satellite communication system to the normal network operation cluster, the computer system 140 can visually update the height of the bars 711 and 712 based on the updated count of the number of feature vectors assigned to the normal network operation cluster. Similarly, the computer system 140 can visually update the height of the bars for a cluster when a feature vector assigned to the cluster is now outside the one hour or 24 hour time period. For example, if a feature vector was assigned to the normal network operation cluster 61 minutes before a current time, the computer system 140 can update the count of the number of feature vectors assigned to the normal network operation cluster (e.g., by subtracting one from the count), and visually reduce the height of the bar 711 based on the updated count.

By animating the bars in the bar graph 701 to increase or decrease in size as the counts of the number of feature vectors assigned to each cluster changes, a user can readily detect when the system is trending towards a particular condition. For example, if new feature vectors are being assigned to the outage/degradation cluster, the computer system 140 can animate the bar 731 growing in height based on the updated counts for the outage/degradation cluster for the last hour. This increase in height indicates that the system is in or trending towards a degraded or outage condition.

FIG. 8 is an example user interface 800 that includes a visualization 801 of clusters of feature vectors. The computer system 140 of FIG. 140 can present the user interface 800, e.g., to network operators or other users. In this example, the user interface 800 includes three clusters 805-807 that are shown in a two-dimensional graph. The cluster 805 can correspond to a normal network operation condition, the cluster 806 can correspond to a busy network operation condition, and the cluster 807 can correspond to a network outage/degradation network operation condition.

In this example, the feature vectors have been assigned to clusters using t-SNE techniques. The t-SNE techniques can use non-linear dimensionality reduction to create low dimensionality maps of higher dimensional data. An advantage of using t-SNE techniques to cluster the feature vectors is that the FVNHs can be input to the t-SNE models without the dimensions being reduced (e.g., using a feed forward neural network or PCA as described above). The example user interface 800 illustrates how hundreds of FVNHs having a dimensionality of approximately 100 dimensions have been clustered using t-SNE.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
   accessing, by the one or more computers, data indicating operating conditions corresponding to different clusters of network information;
   using, by the one or more computers, one or more machine learning models to assign a set of network information for a communication system to a particular cluster from among the different clusters of network information;
   based on the assignment of the set of network information for the communication system to the particular cluster, detecting, by the one or more computers, that the communication system is in or is progressing toward a particular operating condition; and
   providing, by the one or more computers, data indicating the particular operating condition.

2. The method of claim 1, further comprising using the one or more machine learning models to determine a cluster assignment for each of multiple sets of network information for the communication system, wherein each of the multiple sets of network information indicates properties of the communication system at a different time over a period of time.

3. The method of claim 2, wherein detecting that the communication system is in or progressing toward a particular operating condition is based on a quantity of sets of network information assigned to the particular cluster.

4. The method of claim 2, wherein detecting that the communication system is in or progressing toward a particular operating condition comprises determining that a frequency at which sets of network information for the communication system are being assigned to the particular cluster satisfies a threshold.

5. The method of claim 2, wherein detecting that the communication system is in or progressing toward a particular operating condition comprises determining that a frequency at which sets of network information for the communication system are being assigned to the particular cluster is increasing at a rate that satisfies a threshold.

6. The method of claim 2, wherein detecting that the communication system is in or progressing toward a particular operating condition comprises determining that at least a threshold quantity of sets of network information are within a threshold distance of a centroid of the particular cluster.

7. The method of claim 2, wherein detecting that the communication system is in or progressing toward a particular operating condition comprises determining that a quantity of sets of network information for the communication system are assigned to the particular cluster.

8. The method of claim 1, wherein the one or more machine learning models are trained based on sets of network information for the communication system, and wherein the set of network information comprises information about at least one of subsystems or components of the communication system.

9. The method of claim 1, further comprising, in response to detecting that the communication system is in or is progressing toward a particular operating condition, adjusting operation of at least one component of the communication system to resolve the particular operating condition.

10. The method of claim 1, wherein detecting, by the one or more computers, that the communication system is in or is progressing toward a particular operating condition comprises determining that the communication system is in or is progressing towards a particular degradation condition from among multiple different degradation conditions corresponding to different clusters, each of the different degradation conditions representing types of degraded performance or service outages of the communication system; and
wherein the method further comprises, based on determining that the communication system is in or is progressing towards the particular degradation condition:
selecting a corrective action based on the particular degradation condition; and
altering operation of the communication system by performing the selected corrective action to improve performance of the communication system.

11. The method of claim 1, wherein providing, by the one or more computers, data indicating the particular operating condition, comprises continuously or periodically adjusting a graphical user interface by causing the graphical user interface to display which clusters sets of network information for the communication system are assigned.

12. The method of claim 1, further comprising:
selecting, by the one or more computers based on the particular operating condition, one or more recommended actions for resolving the particular operation condition;
updating, by the one or more computers, a user interface to enable a user to select from the one or more recommended actions;
receiving, by the one or more computers, data indicating a selected recommended action selected from the one or more recommended actions; and
initiating, by the one or more computers, the selected recommended action.

13. A system, comprising:
one or more computers; and
one or more computer-readable media storing instructions that, when executed by the one or more computers, cause the one or more computers to perform operations comprising:
accessing data indicating operating conditions corresponding to different clusters of network information;
using one or more machine learning models to assign a set of network information for a communication system to a particular cluster from among the different clusters of network information;
based on the assignment of the set of network information for the communication system to the particular cluster, detecting that the communication system is in or is progressing toward a particular operating condition; and
providing data indicating the particular operating condition.

14. The system of claim 13, wherein the operations comprise using the one or more machine learning models to determine a cluster assignment for each of multiple sets of network information for the communication system, wherein each of the multiple sets of network information indicates properties of the communication system at a different time over a period of time.

15. The system of claim 14, wherein detecting that the communication system is in or progressing toward a particular operating condition is based on a quantity of sets of network information assigned to the particular cluster.

16. The system of claim 14, wherein detecting that the communication system is in or progressing toward a particular operating condition comprises determining that a frequency at which sets of network information for the communication system are being assigned to the particular cluster satisfies a threshold.

17. The system of claim 14, wherein detecting that the communication system is in or progressing toward a particular operating condition comprises determining that a frequency at which sets of network information for the communication system are being assigned to the particular cluster is increasing at a rate that satisfies a threshold.

18. The system of claim 14, wherein detecting that the communication system is in or progressing toward a particular operating condition comprises determining that at least a threshold quantity of sets of network information are within a threshold distance of a centroid of the particular cluster.

19. The system of claim 13, wherein the operations comprise, in response to detecting that the communication system is in or is progressing toward a particular operating condition, adjusting operation of at least one component of the communication system to resolve the particular operating condition.

20. One or more non-transitory computer-readable media storing instructions that, when executed by one or more computers, cause the one or more computers to perform operations comprising:
accessing data indicating operating conditions corresponding to different clusters of network information;
using one or more machine learning models to assign a set of network information for a communication system to a particular cluster from among the different clusters of network information;
based on the assignment of the set of network information for the communication system to the particular cluster, detecting that the communication system is in or is progressing toward a particular operating condition; and
providing data indicating the particular operating condition.

* * * * *